(No Model.)
B. F. KEENEY.
BROADCAST HAND SEEDER.
No. 429,454. Patented June 3, 1890.
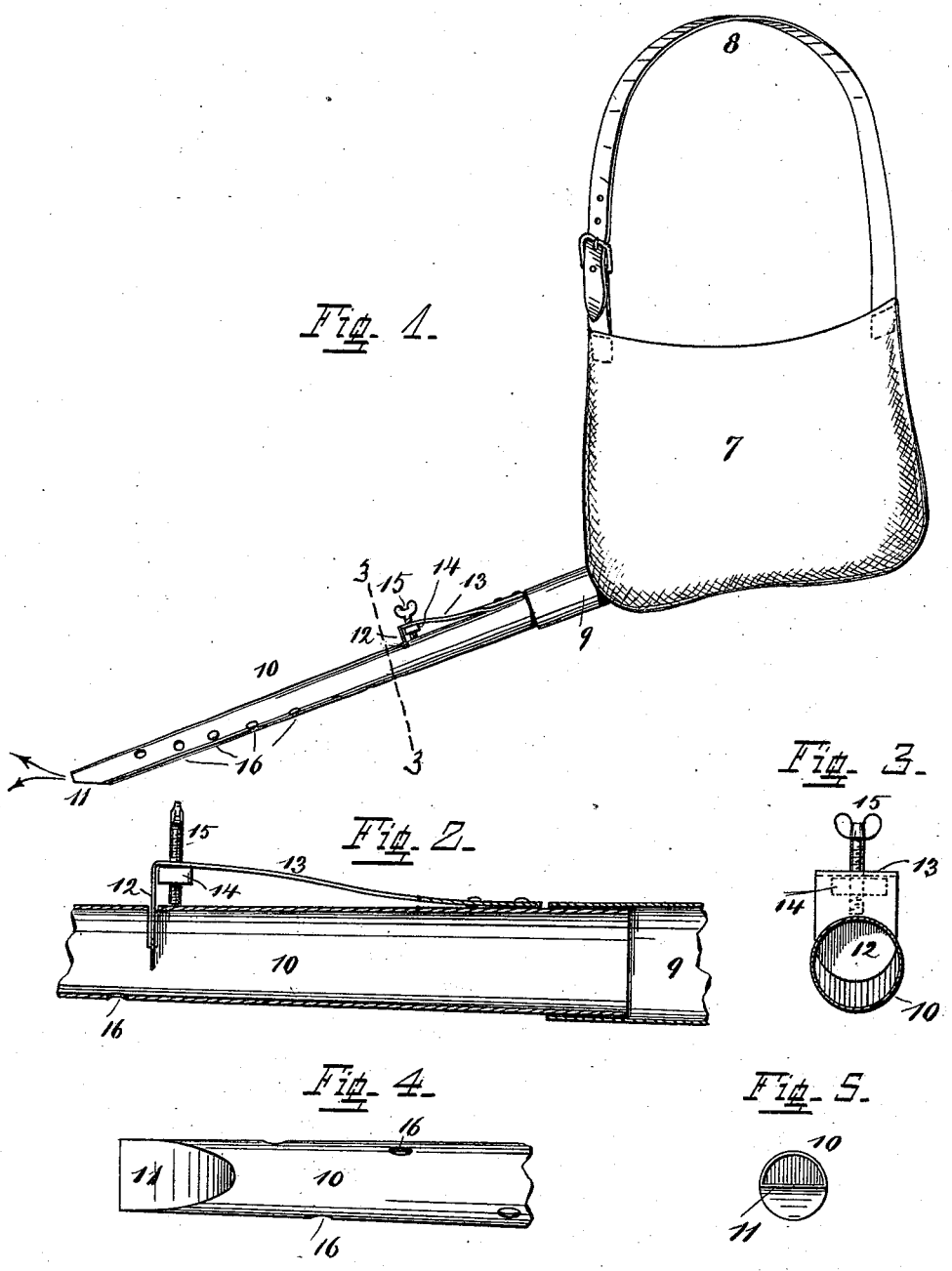
Attest
Orrin Cady
S. Lieber
Inventor
Benjamin F. Keeney
by Carl Spengel his Atty.

UNITED STATES PATENT OFFICE.

BENJAMIN F. KEENEY, OF QUERCUS GROVE, INDIANA.

BROADCAST HAND-SEEDER.

SPECIFICATION forming part of Letters Patent No. 429,454, dated June 3, 1890.

Application filed February 18, 1890. Serial No. 340,855. (No model.)

*To all whom it may concern:*

Be it known that I, BENJAMIN F. KEENEY, a citizen of the United States, residing at Quercus Grove, in the county of Switzerland and State of Indiana, have invented certain new and useful Improvements in Broadcast Hand-Seeders; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to broadcast hand-seeders—such as illustrated in Patent No. 130,507, of August 13, 1872—and it pertains particularly to improvements whereby the seed is more evenly scattered, and in combination with these to such changes whereby the manipulation of the implement is made less tiresome. One of the main objections to the old construction was that the seed, owing to a large opening at the end of the tube, would leave the same in a close bunch and be deposited in such condition by the customary swinging motion of the operator. The seed would cover only a limited space of the ground, being thickest, of course, within the direct range or zone of the throw. Between these zones the ground would be only sparsely sown, causing at the end a very uneven growth of the respective crops. This difficulty I overcome by arranging a contracted mouth-piece, guiding or throwing the seed first upwardly after leaving the tube, causing it to be longer suspended in the air between its discharge and final deposit, and thus giving it more time to separate. In order to still more equalize any uneven discharge, especially at the beginning, respectively, change of the reciprocatory motion, when the tube from its extreme position to one side is swung back to the other, at which time and position practically none, or at least very little, of the seed leaves the spout, I provide a number of holes in the main tube, allowing a constant and limited escape of seed taking place, which is not dependent for its deposit on the ordinary swinging motion, and therefore fills in most effectually the generally-neglected spaces between the zones. As the seed crowds toward the contracted opening of the tube, it increases materially the pressure with which it escapes, and in order to secure a proper and even discharge from the holes in said tube, I arrange the former in a line, rising from the under side of the tube toward its upper side as they approach the main discharge-opening at the extreme outer end of the tube, where the pressure of the escaping seed, being more accumulated, is higher than at those holes located farther back from the mouth. The provision of these holes necessitates a different location of the regulating-valve, which is transferred from the front part of the tube to its rear, holding back all superfluous seed which could not escape readily and ordinarily would fill up the tube, greatly increasing its weight while in use and making its manipulation very tiresome. The means for regulating this valve have also been greatly improved.

All these improvements and alterations are fully illustrated in the accompanying drawings, in which—

Figure 1 shows the device ready for use. Fig. 2 shows part of the tube near its outer end in longitudinal section. Fig. 3 is a cross-section of the tube on line 3 3 of Fig. 1. Fig. 4 is an under side view of the discharge end, and Fig. 5 is an end view of the same. Figs. 2, 3, 4, and 5 are drawn at an enlarged scale.

7 is a suitable bag holding the seed.

8 is a strap of leather or canvas, adjustable in length, whereby the bag is suspended and carried by the operator over his shoulder.

9 is a socket-piece connected to one corner of the bag, into which the discharge-tube 10 is inserted. The under side of this tube near its outer end flares upwardly at 11, in order to give the escaping seed an upward impetus.

12 is a gate-valve forming part of a spring 13, which is riveted or soldered to the main tube. The pressure of this spring is downward, and if free would close the valve, but is held open by a nut 14, moving up and down on thumb-screw 15, whereby the position of the valve is properly regulated, according to the kind and amount of seed to be deposited. The opening in the spring through which the screw passes is larger than this latter, the spring resting solely on nut 14, which moves up and down on this screw when it is operated. To prevent nut 14 from turning with the screw, it is of square shape and fits against the upper part of valve 12.

16 is a series of openings starting at the lower side of the tube forward of the valve and rise toward the top as they approach the discharge end.

The procedure of operation is as follows: The bag having been supplied and the valve properly set, the former is hung over the shoulder and the operator starts over the field, holding the discharge-tube out from him and swinging it from right to left, and vice versa. It is best to adopt a system whereby the swinging motion of the tube corresponds more or less with the stepping motion of the feet. The seed leaves the spout in an upward direction, as shown by arrows in Fig. 1 of the drawings, giving it ample time to fully separate before it reaches the ground. The volume of discharge is diminished at a point and time corresponding with the dead-point of a crank on a steam-engine—that is, during the time and position when the tube, having been swung to its extreme limit to one side, is started back again to the other side. To provide, however, a discharge at those points, holes 16 are provided, discharging constantly in a small way and independent of the swinging motion. Valve 12 by its location holds all superfluous seed back in the bag, preventing the tube from getting packed, which would considerably increase its weight, to the discomfort of the user, as the swinging of a heavy tube is very tiresome.

The provision of nut 14 is a great advantage and very much better than cutting a screw-thread into the thin spring, which had to be renewed when its thread wore off, while now the only part to be replaced is the nut. This latter, being thicker and having more threads, lasts much longer than a thin spring would having only a few threads, which soon wear out.

Having described my invention, I claim as new—

1. In a broadcast hand-seeder, the combination of a bag for the reception of the seed, and suitably constructed to be carried by the operator, with a discharge-tube attached to one of the lower corners of the bag and having a number of small discharge-openings in it, which are arranged in a line rising from the under side of said tube upwardly as they approach the main discharge end, all as fully shown and described.

2. In a broadcast hand-seeder, the combination of a bag for the reception of the seed, and suitably constructed to be carried by the operator, with a discharge-tube attached to one of the lower corners of the bag having a contracted mouth, whereby the seed is guided and thrown upwardly and given an impetus in that direction after leaving the tube, for the reasons and purposes explained.

3. In a broadcast hand-seeder, the combination, with a bag for the reception of the seed, of a discharge-tube having a number of small discharge-openings in it, which are arranged in a line, rising from the under side of said tube upwardly as they approach the main discharge end, and a contracted mouth or outlet at the end of said tube, whereby the seed is guided and thrown upwardly and given an impetus in that direction after leaving the former, all as fully shown and described.

4. In combination with the discharge-tube of a broadcast hand-seeder having a contracted outlet at its end and a number of small discharge-openings, arranged as described, the spring-actuated valve held open by a nut kept from turning with the thumb-screw passing through it by the upper part of the valve and regulated in its position by said thumb-screw, all as fully shown and described.

In testimony whereof I affix my signature in presence of two witnesses.

BENJAMIN F. KEENEY.

Witnesses:
CARL SPENGEL,
D. B. LEE.